US007089791B2

(12) United States Patent  
Pradier

(10) Patent No.: US 7,089,791 B2
(45) Date of Patent: Aug. 15, 2006

(54) WHEEL ASSEMBLY EQUIPPED WITH A TACHOMETER

(75) Inventor: Jean-Clair Pradier, Houilles (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 10/499,910

(22) PCT Filed: Jan. 20, 2003

(86) PCT No.: PCT/FR03/00173

§ 371 (c)(1),
(2), (4) Date: Jun. 22, 2004

(87) PCT Pub. No.: WO03/062833

PCT Pub. Date: Jul. 31, 2003

(65) Prior Publication Data

US 2005/0039531 A1  Feb. 24, 2005

(30) Foreign Application Priority Data

Jan. 21, 2002  (FR)  .................................. 02 00715

(51) Int. Cl.
*G01P 1/02* (2006.01)
(52) U.S. Cl. ...................................... 73/494
(58) Field of Classification Search ............... 73/494; 324/164; 310/168
See application file for complete search history.

(56) References Cited

U.S. PATENT DOCUMENTS 3,539,851 A * 11/1970 Bozsvai ........................ 310/91
3,683,219 A *  8/1972 Werner et al. ............... 310/168
3,783,316 A *  1/1974 Madigan ....................... 310/90
5,190,247 A *  3/1993 Le Chatelier ............ 244/103 R

FOREIGN PATENT DOCUMENTS

DE       20 45 917      3/1972
DE       41 25 695      2/1992
GB       2 137 040      9/1984

* cited by examiner

*Primary Examiner*—Charles Garber
*Assistant Examiner*—Tamiko Bellamy
(74) *Attorney, Agent, or Firm*—Young & Thompson

(57) ABSTRACT

The equipment for measuring the speed of rotation of a vehicle wheel (14) carried by a wheel axle (12) comprises a tachometer (30) having a stator (32) suitable for being secured to the wheel axle (12), a rotor (34) suitable for being rotated by the wheel (14), and a connector (110) secured to the stator (32) for electrical connection of the tachometer. The connector (110) includes a set of connection terminals (114A). The equipment further comprises an information transmission member (82) carried by the tachometer stator (32) and suitable for co-operating with a complementary information transmission member (74) constrained to rotate with the wheel (14). Said tachometer connector (110) includes additional connection terminals (114B) to which said information transmission member (82) is connected for transmitting said information.

17 Claims, 3 Drawing Sheets

WHEEL ASSEMBLY EQUIPPED WITH A TACHOMETER

BACKGROUND OF THE INVENTION

The present invention relates to equipment for measuring the speed of rotation of a vehicle wheel carried by a wheel axle, the equipment being of the type comprising a tachometer having a stator suitable for being secured to the wheel axle, a rotor suitable for being rotated by the wheel, and a connector secured to the stator for electrical connection of the tachometer, which connector includes a set of connection terminals, the equipment further comprising an information transmission member carried by the stator of the tachometer and suitable for co-operating with a complementary information transmission member constrained to rotate with the wheel.

The invention also relates to a wheel assembly.

In airplanes, it is known to provide in each wheel axle with a tachometer enabling the speed of rotation of the airplane wheel to be determined, in particular while running on the takeoff runway.

In addition, it is known to provide the wheels with devices for detecting tire pressure. Such devices need to be associated with means for transmitting information between the wheel and the hub on which the wheel is rotatably mounted.

Those information transmission means generally comprise two complementary transmitter and receiver members disposed facing each other. One is secured to the cover plate of the wheel substantially on the axis of rotation, and the other is secured to the wheel axle, in the vicinity of the axis of rotation of the wheel.

Thus, one of the information transmission members is disposed inside the wheel axle in the vicinity of the tachometer.

Both the tachometer and the information transmission member secured to the wheel axle have respective connectors enabling them to be wired to a cable bundle leading to the airplane cockpit.

In certain types of airplane, in particular business airplanes, the space available inside the axle for the tachometer and the information transmission member is very small.

Thus, in order to enable the cable bundle to be connected to both connectors, the connectors need to be placed in succession along the axis of the axle. One of the connectors is then carried at the end of a support arm secured to the tachometer. This arm is relatively long. It is therefore fragile and constitutes a source of vibration.

SUMMARY OF THE INVENTION

An object of the invention is to propose a tachometer and an information transmission member that can easily be installed in a hub and that are compact.

To this end, the invention provides equipment of the above-specified type for measuring the angular speed of rotation of a wheel, the equipment being characterized in that said tachometer connector includes additional connection terminals to which said information transmission member is connected to transmit said information.

In particular embodiments, the equipment further includes one or more of the following characteristics:
the information transmission member is secured to the tachometer to form a unitary module, and it includes means for fixing the unitary module to the wheel axle;
said means for fixing the unitary module to the wheel axle comprise a bell adapted to be engaged in the wheel axle, and the tachometer and the information transmission member are connected to said bell;
the tachometer stator includes at least one duct for passing conductors to provide the connection between the information transmission member and the connection terminals of the connector; and
the equipment has fitted thereto a shielded tube providing mechanical and electromechanical protection to conductors providing the connection between the information transmission member and the connection terminals of the connector, which tube extends generally along the stator.

The invention also provides a wheel assembly comprising a vehicle wheel, a wheel axle carrying the wheel, and equipment for measuring the speed of rotation of the wheel as defined above.

BRIEF DESCRIPTION OF THE DRAWINGS

The invention will be better understood on reading the following description given purely by way of example and made with reference to the drawings, in which.

DESCRIPTION OF THE PREFERRED EMBODIMENTS

Figure 1:
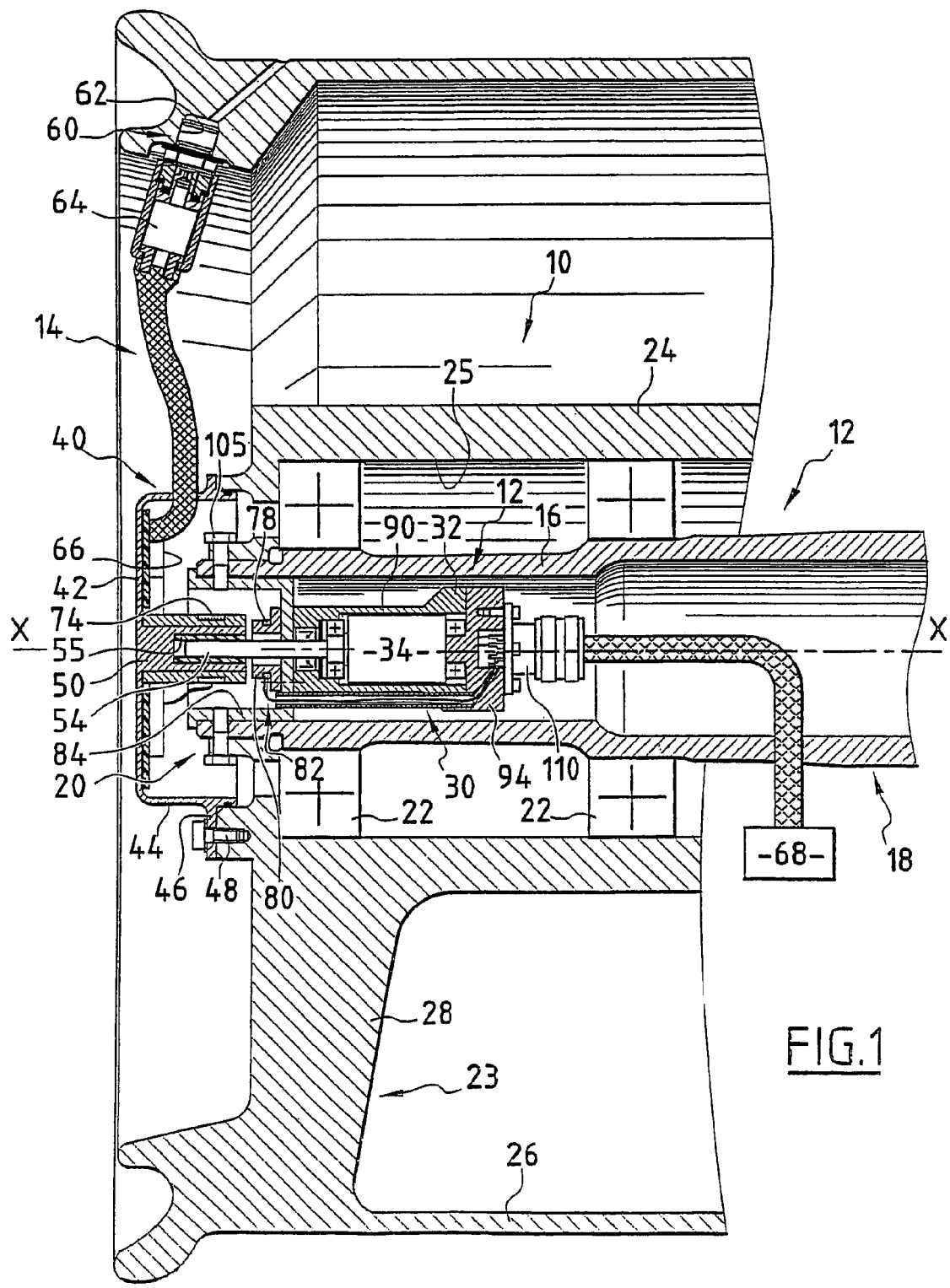
FIG. 1 is a longitudinal section view of a wheel assembly of the invention, the tire not being shown.

The wheel assembly 10 shown in FIG. 1 forms part of the landing gear of an airplane. It includes a landing gear axle 12 constituting a stationary portion and a wheel 14 mounted to rotate about the axis X—X of the axle.

The axle 12 presents a hollow body 16 of generally tubular shape about the axis X—X. The body 16 is connected at one end 18 to the remainder of the structure of the landing gear. The other end, referenced 20, of the body 16 forms a free end of the axle.

The wheel 14 is mounted to rotate about the axle 12 via two ball bearings 22 that are spaced about along the axis of the axle.

The wheel 14 comprises a rim 23 on which there is mounted a tire (not shown). The rim 23 comprises a hub 24 with a through passage 25 in which the axle 12 and the two ball bearings 22 are received.

The rim 23 also comprises an outer ring 26 for supporting a tire. The hub 24 and the ring 26 are interconnected by radial arms 28 that are separated from one another by ventilation slots.

Inside the axle 12 there is a tachometer 30 for measuring rotation of the wheel. The tachometer comprises a stator 32 secured to the axle 12 and a rotor 34 that is rotatable relative to the stator.

The moving rotor is constrained to rotate with the wheel 14, e.g. by means of a cup 40 forming a cap fitted to the rim 23 on its axis. The cup 40 presents an end wall 42 surrounded by a generally cylindrical side wall 44. At its open end, the side wall presents an outwardly-directed peripheral collar 46 enabling the cup 40 to be secured to the rim 23, by means of screws 48.

The axis of the cup 40 extends generally along the axis of rotation X—X of the wheel. The cup 40 includes an axial bushing 50 facing towards the axle. This bushing presents a hole 52 suitable for receiving a shaft 54 extending along the axis X—X. The shaft 54 is constrained to rotate with the rotor 34 of the tachometer.

A resilient sleeve 55 placed in the hole 52 is interposed between the bushing 50 and the shaft 54. The sleeve 55 serves to drive the shaft 54 in rotation from the bushing 50, while also accommodating any possible axial offsets. The connections between the sleeve 55 and the bushing 50, and between the sleeve 55 and the shaft 54 are provided by friction.

A pressure sensor 60 is mounted on the wheel. For this purpose, and in known manner, the ring 26 of the wheel is provided with a housing 62 in which a pressure probe 64 is received that is suitable for measuring the pressure inside the tire on the wheel. The sensor 60 also includes a signal processor and probe control module 66. This module is connected to the probe 64.

The module 66 is constituted by a printed circuit secured to the end wall of the cup 40 around the bushing 50.

A data processor unit 68 is secured to the stationary portion of the landing gear or to the body of the airplane. It is adapted to make use of the pressure measurements taken by the sensor 60, and in particular to display them.

The sensor 60 and the data processor unit 68 are connected together by information communication means given overall reference 70. These communication means are adapted to establish transmission between the sensor 60 and the data processor unit 68, e.g. by radio. This transmission is both-way transmission, i.e. each entity can both send and receive information.

These communication means are also adapted to transmit, by radio waves, the electrical energy needed to operate the sensor 60.

More precisely, the communication means 70 comprise a rotary coil 74 secured to the wheel. This coil is carried by the cup 40 and is disposed on the axis X—X about the bushing 50.

In analogous manner, the communication means 70 include a stationary coil 78 constrained in rotation with the axle 12.

The coils 74 and 78 are placed to face each other so as to establish radio wave communication between the moving and stationary portions of the wheel assembly.

The stationary coil 78 is carried by a support sleeve 80 engaged around the shaft 54. The sleeve 80 is constrained in rotation with the body 32 of the tachometer. The shaft 54 is free to turn through the sleeve 80.

The sleeve 80 and the stationary coil 78 together form an information transmission member 82 secured to the axle 12 and disposed inside it. The tachometer 30 and the information transmission member 82 are both carried by the same support bell 84 that connects them to the axle 12.

Figure 2:
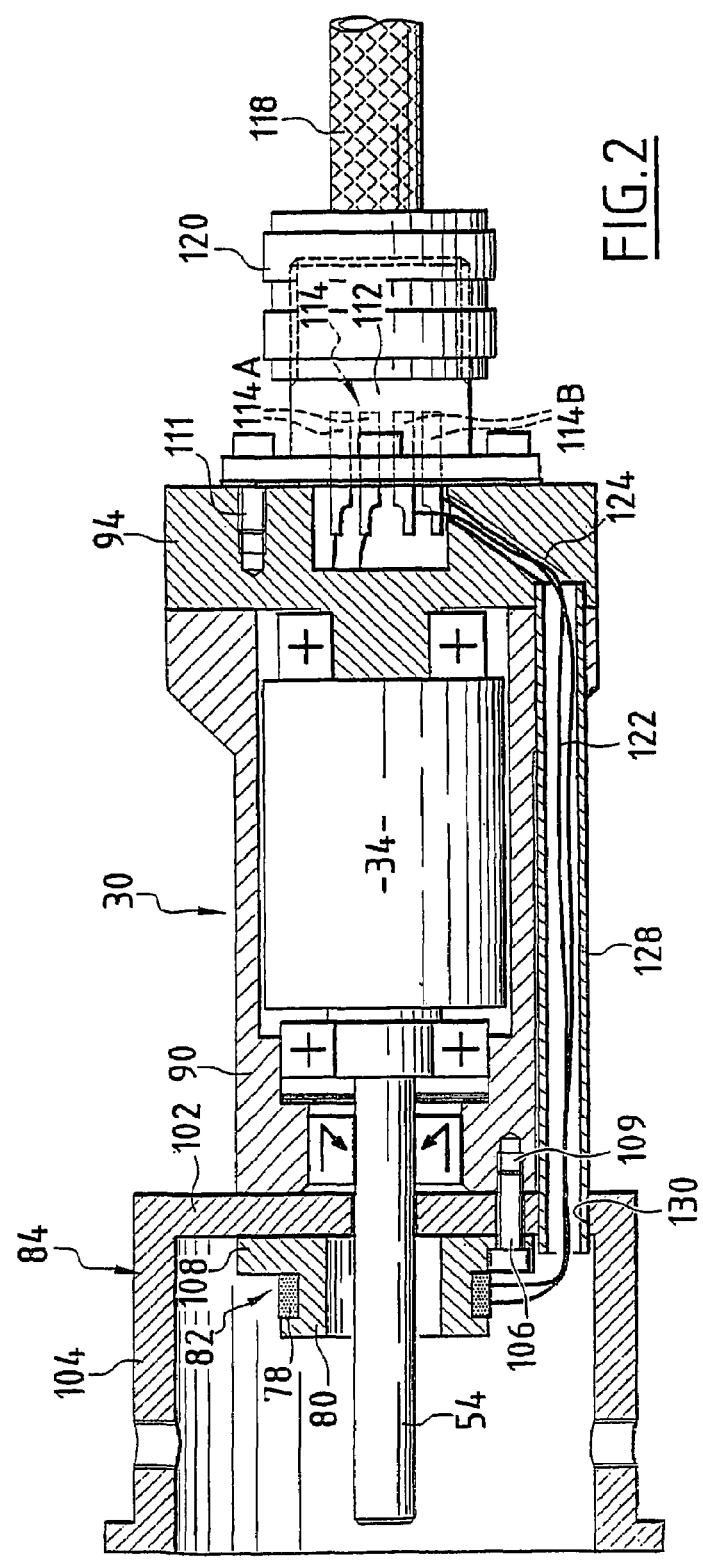
FIG. 2 is a view on a larger scale of the speed measuring equipment shown on its own.

More precisely, and as shown in FIG. 2, the stator of the tachometer 30 presents a body 90 of generally cylindrical shape having the rotor 34 rotatably mounted therein. The rotor is extended by the shaft 54 beyond a front end of the body 90. At its rear end remote from the end where the rotor 34 is connected to the shaft 54, the body 90 is closed by an end cover 94. The body 90 is secured to the support bell 84 via its front end.

The bell 84 presents a flat end wall 102 with a passage formed through the center thereof for the shaft 54. The end wall 102 is surrounded by a peripheral cylindrical skirt 104 whose outside diameter corresponds to the inside diameter of the axle 12.

The communication member 86 constituted by the sleeve 80 and the stationary coil 78 is disposed inside the bell 84 and is held to the end wall thereof, e.g. by means of screws 106 engaged through a collar 108 formed integrally with the sleeve. These screws pass through the end wall 102 of the bell and are received in tapped blind holes 109 of the body.

The tachometer 30 includes a connector 110 secured by screws 111 to the rear cover 94. The connector 110 comprises a body 112 and a set of connection terminals 114 carried by the body. The connector is adapted to establish an electrical connection with a connection cable 118 fitted at its end with a complementary connector 120 suitable for co-operating with the connector 110 and adapted to connect each terminal 114 thereof to independent conductor wires of the cable 118.

Some of the terminals 114A of the connector are connected to functional detector elements of the tachometer 30.

Other terminals 114B of the connector are connected by conductor wires 122 to the stationary coil 78 of the information transmission member. These wires 122 pass through the body 90 and the cover 94 via a duct 124 opening out behind the connector 110. The duct 124 is extended by a shielded tube 128 extending partially through the body 90 and partially along it. The tube 128 extends essentially along the stator 32 of the tachometer. It terminates at an open end passing through an orifice 130 formed in the end wall 102 of the bell so as to allow the wires 122 to pass into the bell.

The tube is preferably made of metal so as to provide mechanical and electromagnetic protection. It may also be made of an insulating material that is mechanically strong and that is covered in a layer of metallization.

Since the tube 128 is shielded and grounded, it provides electromagnetic protection for the signals coming from and going to the information transmission member 82 against the signal generated by the tachometer, thus ensuring that the tachometer signals and the signals of the information transmission member 82 are unaffected by one another.

Thus, the functional elements both of the tachometer 30 and of the information transmission member 82 are connected by electrical conductors to terminals 114 of a single connector 110.

Under such conditions, it will be understood that the speed measuring equipment constituted by the tachometer 30, and the information transmission member 82 together with its bell 84 can be mounted simply as a single part inside the wheel axle 12, and that this equipment can easily be connected by installing only one additional connector 120 which is fitted to the connector 110.

Figure 3:
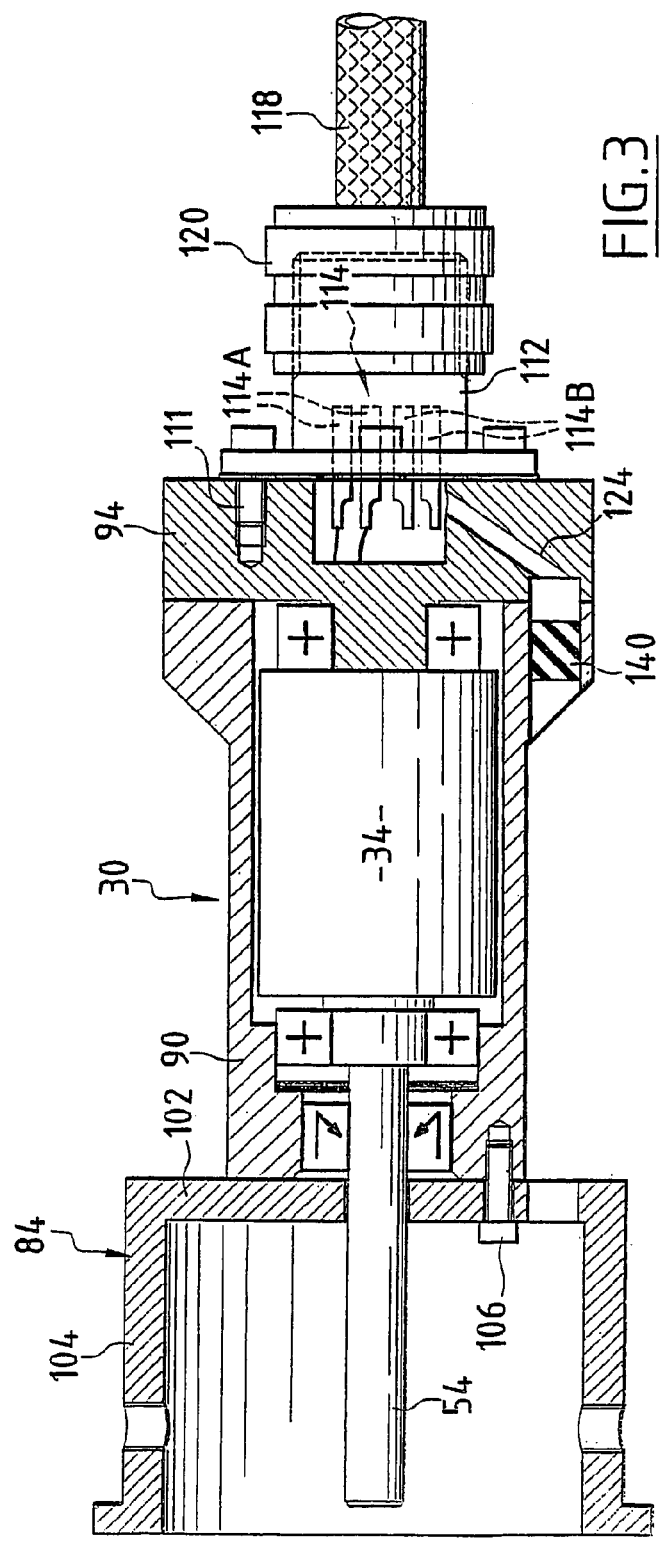
FIG. 3 is a longitudinal section view of the tachometer shown on its own.

In addition, as shown in FIG. 3, the tachometer 30 can, without modification, be used in a wheel arrangement that does not include information transmission means for transmitting pressure information.

Under such circumstances, the tachometer 30 is secured to the support bell 84, but the information transmission member 82 is not secured to the bell. In addition, the tube 128 is absent and the duct 124 is closed by a plug 140. The same connector 110 is retained. Nevertheless, the terminals 114B are not connected to conductor wires, and these terminals may even be omitted.

It can thus be seen that the same tachometer can be used in most contexts, with or without an associated information transmission member. This reduces the unit manufacturing cost of the tachometer, given large production volume.

The invention claimed is:

1. Equipment for measuring the speed of rotation of a vehicle wheel (14) carried by a wheel axle (12), the equipment comprising a tachometer (30) having a stator (32) suitable for being secured to the wheel axle (12), a rotor (34) suitable for being rotated by the wheel (14), and a connector (110) secured to the stator (32) for electrical connection of the tachometer, which connector (110) includes a set of connection terminals (114A), the equipment further comprising an information transmission member (82) carried by the stator (32) of the tachometer and suitable for co-operating with a complementary information transmission member (74) constrained to rotate with the wheel (14), wherein said tachometer connector (110) includes additional connection terminals (114B) to which said information transmission member (82) is connected to transmit said information, the tachometer providing a first information and the information transmission member providing a second information different from the first information.

2. Measuring equipment according to claim 1 wherein the information transmission member (82) is secured to the tachometer (30) to form a unitary module, and wherein the equipment includes means (84, 105) for fixing the unitary module to the wheel axle (12).

3. Measuring equipment according to claim 2 wherein said means for fixing the unitary module to the wheel axle comprise a bell (84) adapted to be engaged in the wheel axle (12), and wherein the tachometer (30) and the information transmission member (82) are connected to said bell.

4. Equipment according to claim 1 wherein the tachometer stator includes at least one duct (124) for passing conductors (122) to provide the connection between the information transmission member (82) and the connection terminals (114B) of the connector (110).

5. Equipment according to claim 1 the equipment having fitted thereto a shielded tube (128) providing mechanical and electromechanical protection to conductors (122) providing the connection between the information transmission member (82) and the connection terminals (114B) of the connector, which tube extends generally along the stator (32).

6. A wheel assembly comprising a vehicle wheel (14), a wheel axle (12) carrying the wheel (14), and equipment for measuring the speed of rotation of the wheel according to claim 1.

7. Equipment of claim 1 wherein the tachometer provides speed information and the information transmission member provides non-speed information.

8. Equipment for measuring the speed of rotation of a vehicle wheel (14), comprising:
a wheel assembly (10) including an axle (12), the axle comprising a hollow body (16) of tubular shape and a free end (20);
a wheel (14) mounted to rotate about an axis (X—X) of the axle;
a tachometer (30), mounted proximate the axle (12) measuring rotation of the wheel (14), comprising a stator (32) secured to the axle (12) and a rotor (34) rotatable relative to the stator, the moving rotor constrained to rotate with the wheel (14);
an information transmission member (82) carried by the stator (32) and co-operating with a complementary information transmission member (74) constrained to rotate with the wheel (14); and
an electrical connector (110) secured to the stator (32), the connector (110) including a first set of connection terminals (114A) and a second set of connection terminals (114B)
the tachometer electrically connected to the first set of terminals (114A) to transmit an output of the tachometer,
the information transmission member (82) connected to the second set of terminals (114B) to transmit an output of the information transmission member,
the tachometer providing a first information and the information transmission member providing a second information different from the first information.

9. Equipment of claim 8, wherein the tachometer provides speed information and the information transmission member provides non-speed information.

10. Equipment of claim 9, wherein the information transmission member transmits a pressure value from a pressure sensor (60) mounted on the wheel.

11. Equipment of claim 10 further comprising: a communication component (70) connected to the information transmission member; and
an antenna connected to the communication component, the antenna receiving the second information from a remote sensor.

12. Equipment of claim 11 wherein,
the communication equipment (70) comprise a rotary coil (74) secured to the wheel and a stationary coil (78) constrained in rotation with the axle (12),
the rotary coil and the stationary coil placed to face each other so as to establish radio wave communication between the moving and stationary portions of the wheel assembly to transmit the pressure value from the pressure sensor to the information transmission member.

13. Equipment of claim 12 wherein,
a shaft (54) extends along the axis (X—X) of the axle, the shaft constrained to rotate with the rotor of the tachometer,
the stationary coil (78) is carried by a support sleeve (80) engaged around the shaft, the sleeve (80) constrained in rotation with the stator (32) of the tachometer, the shaft (54) free to turn through the sleeve 80,
the information transmission member being comprised of the sleeve (80) and the stationary coil (78) secured to the axle (12) and disposed inside the axle.

14. Equipment of claim 13, further comprising:
a support bell (84) commonly carrying the tachometer (30) and the information transmission member (82) and connecting the tachometer and the information transmission member to the axle (12).

15. Equipment for measuring the speed of rotation of a vehicle wheel (14), comprising:
an axle (12), the axle comprising a hollow body (16) of tubular shape;
a wheel (14) mounted to rotate about an axis (X—X) of the axle;
a tachometer (30), mounted proximate the axle (12) measuring rotation of the wheel (14), comprising a stator (32) secured to the axle (12) and a rotor (34) rotatable relative to the stator, the moving rotor constrained to rotate with the wheel (14), the tachometer outputting a speed signal;
an information transmission member (82) carried by the stator (32) and co-operating with a complementary information transmission member (74) constrained to rotate with the wheel (14), the information transmission member outputting a non-speed signal; and
an electrical connector (110) secured to the stator (32), the connector (110) including a first set of connection terminals (114A) and a second set of connection terminals (114B),
the tachometer electrically connected to the first set of terminals (114A) to transmit the speed output of the tachometer, the information transmission member (82) connected to the second set of terminals (114B) to transmit the non-speed output of the information transmission member.

16. The equipment of claim 15 wherein the non-speed output of the information transmission member is a tire pressure signal.

17. The equipment of claim 15 wherein speed measuring elements of the tachometer (30) and the information transmission member (82) are mounted as a single part inside the hollow body of the axle.

* * * * *